(12) United States Patent
Krishnan et al.

(10) Patent No.: US 11,551,081 B2
(45) Date of Patent: Jan. 10, 2023

(54) MACHINE LEARNING MODELS FOR SENTIMENT PREDICTION AND REMEDIAL ACTION RECOMMENDATION

(71) Applicant: SAP SE, Walldorf (DE)

(72) Inventors: Kavitha Krishnan, Bangalore (IN); Naga Sai Narasimha Guru Charan Koduri, Vijayawada (IN); Baber Farooq, Melbourne (AU)

(73) Assignee: SAP SE, Walldorf (DE)

( * ) Notice: Subject to any disclaimer, the term of this patent is extended or adjusted under 35 U.S.C. 154(b) by 433 days.

(21) Appl. No.: 16/707,592

(22) Filed: Dec. 9, 2019

(65) Prior Publication Data

US 2021/0174195 A1 Jun. 10, 2021

(51) Int. Cl.
*G06N 3/08* (2006.01)
*G06N 20/00* (2019.01)
*G06N 3/04* (2006.01)
*G06N 7/00* (2006.01)

(52) U.S. Cl.
CPC ............... *G06N 3/08* (2013.01); *G06N 3/04* (2013.01); *G06N 7/005* (2013.01); *G06N 20/00* (2019.01)

(58) Field of Classification Search
CPC ............ G06N 3/08; G06N 20/00; G06N 3/04; G06N 7/005
See application file for complete search history.

(56) References Cited

U.S. PATENT DOCUMENTS

| 10,354,184 | B1* | 7/2019 | Vitaladevuni | G06Q 30/0255 |
| 2013/0268457 | A1* | 10/2013 | Wang | G06Q 30/0203 705/347 |
| 2017/0200205 | A1* | 7/2017 | Liu | G06N 20/00 |
| 2018/0365025 | A1* | 12/2018 | Almecija | G06N 20/00 |
| 2019/0347675 | A1* | 11/2019 | Yang | A63F 13/60 |
| 2019/0362242 | A1* | 11/2019 | Pillai | G06N 20/00 |

OTHER PUBLICATIONS

Oztekin et al., "A machine learning-based usability evaluation method for eLearning systems", May 17, 2013, Decision Support Systems 56 (2013), pp. 63-73. (Year: 2013).*

* cited by examiner

*Primary Examiner* — Ying Yu Chen
(74) *Attorney, Agent, or Firm* — Mintz Levin Cohn Ferris Glovsky and Popeo, P.C.

(57) ABSTRACT

A method may include applying, to various factors contributing to a sentiment that an end user exhibits towards an enterprise software application, a first machine learning model trained to determine, based on the factors, a sentiment index indicating the sentiment that the end user exhibits towards the enterprise software application. In response to the sentiment index exceeding a threshold value, a second machine learning model may be applied to identify remedial actions for addressing one or more of the factors contributing to the sentiment of the end user. A user interface may be generated to display, at a client device, a recommendation including the remedial actions. The remedial actions may be prioritized based on how much each corresponding factor contribute to the sentiment of the end user. Related systems and articles of manufacture are also provided.

16 Claims, 5 Drawing Sheets

FIG. 1

| Name | Description |
|---|---|
| Master Data | Customer master data including revenue, industry, procuremt maturity, customer lifecycle, segmentation, referenceability, financial health, and/or the like. |
| Solutions Purchased | List of software application purchased by the customer and the length of ownership. |
| Adoption | Software usage growth in terms of<br>- number of users, number of documents, total spend in the transactions.<br>- measuring usage against the entitlement of the software purchased<br>- transaction RFM (recency, frequency, and monetary in terms of spend)<br>- new features / innovations turned on and used.<br>- software coverage (% of shelved software) |
| Support | Transactions and activities carried out while provinding support during the customer life cycle which includes but not limited to<br>- number of special projects<br>- net promoter score and survey feedback<br>- customer status as an escalated customer<br>- customer engagement index<br>- customer status as a prefered care customer |
| Engagement | Customer engagement index, expert performance data, expert profile, expert inputs, annual performance rating, etc. |

FIG. 2A

| Factor | Remedial Action |
|---|---|
| Master Data | Insights into what combination of software is effective and makes the customer to renew. |
| Solutions Purchased | Propose right set of enterprise software applications, effective usage for each enterprise software application, and propose Application Management Services (AMS), preferred care, and/or the like are needed. |
| Adoption | Identify solution coverage, adopt effective coverage, propose improvements, and/or propose activation of additional features (e.g., quantity of suppliers to invite to request for proposal (RFP) and auction, aware more events in sourcing, adjust cycle time for event based on industry standards, and/or the like). |
| Support | Identify root cause analysis, recommend sourcing requests, sign up for application management service and/or preferred care, etc. |
| Engagement | Customer engagement index, expert performance data, expert profile, expert inputs, annual performance ranting, etc. |

MACHINE LEARNING MODELS FOR SENTIMENT PREDICTION AND REMEDIAL ACTION RECOMMENDATION

TECHNICAL FIELD

The subject matter described herein relates generally to machine learning and more specifically to machine learning models for analyzing sentiment and for recommending remedial actions.

BACKGROUND

The operations of many organizations may rely on a suite enterprise software applications including, for example, enterprise resource planning (ERP) software, customer relationship management (CRM) software, and/or the like. These enterprise software applications may provide a variety of functionalities including, for example, billing, invoicing, procurement, payroll, time and attendance management, recruiting and onboarding, learning and development, performance and compensation, workforce planning, and/or the like. Some enterprise software applications may be hosted by a cloud-computing platform such that the functionalities provided by the enterprise software applications may be accessed remotely by multiple end users. For example, an enterprise software application may be available as a cloud-based service including, for example, a software as a service (SaaS) and/or the like.

SUMMARY

Systems, methods, and articles of manufacture, including computer program products, are provided for sentiment prediction and remedial action recommendation. In one aspect, there is provided a system. The system may include at least one data processor and at least one memory. The at least one memory may store instructions that result in operations when executed by the at least one data processor. The operations may include: applying, to a plurality of factors associated with an end user, a first machine learning model, each of the plurality of factors contributing to a sentiment that the end user exhibits towards an enterprise software application, and the first machine learning model trained to determine, based at least on the plurality of factors, a sentiment index indicating the sentiment that the end user exhibits towards the enterprise software application; in response to the sentiment index exceeding a threshold value, applying a second machine learning model trained to identify a plurality of remedial actions for addressing one or more of the plurality of factors contributing to the sentiment of the end user; and generating a user interface configured to display, at a client device, a recommendation including the one or more remedial actions.

In some variations, one or more features disclosed herein including the following features may optionally be included in any feasible combination. The first machine learning model may be a regression model or a principle component analysis model. The second machine learning model may be a neural network.

In some variations, the first machine learning model may be trained to determine, for each of the plurality of factors, a weight corresponding to how much each of the plurality of factors contribute to the sentiment that the end user exhibits towards the enterprise software application.

In some variations, the second machine learning model may be further trained to determine a priority for each of the plural of remedial actions. A first remedial action addressing a first factor may be associated with a higher priority than a second remedial action addressing a second factor based at least on the first factor contributing more to the sentiment of the end user than the second factor.

In some variations, the first machine learning model may be trained based at least on training data including a plurality of feature vectors. Each of the plurality of feature vectors may include the plurality of factors. The training data may further include a corresponding sentiment index for each of the plurality of feature vectors. The first machine learning model may be trained by at least determining a weight matrix. Applying the weight matrix to each of the plurality of vectors may generate the corresponding sentiment index for each of the plurality of feature vectors.

In some variations, the second machine learning model may be trained based at least on training data including a plurality of feature vectors. Each of the plurality of feature vectors may include the plurality of factors, The training data may further include a correct output indicating how much each of the plurality of factors contribute to a sentiment associated with a corresponding one of the plurality of feature vectors. The second machine learning model may be trained by adjusting one or more weights and/or biases applied by the second machine learning model to minimize an error in an output of the second machine learning model relative to the correct output included in the training data.

In some variations, the plurality of factors may include a master data including one or more data objects required for performing one or more functions of the enterprise software application, a combination of enterprise software applications purchased by the end user, a level of adoption associated with the end user, an availability of support for the enterprise software application, and a level of end user engagement with support.

In another aspect, there is provided a method for sentiment prediction and remedial action recommendation. The method may include: applying, to a plurality of factors associated with an end user, a first machine learning model, each of the plurality of factors contributing to a sentiment that the end user exhibits towards an enterprise software application, and the first machine learning model trained to determine, based at least on the plurality of factors, a sentiment index indicating the sentiment that the end user exhibits towards the enterprise software application; in response to the sentiment index exceeding a threshold value, applying a second machine learning model trained to identify a plurality of remedial actions for addressing one or more of the plurality of factors contributing to the sentiment of the end user; and generating a user interface configured to display, at a client device, a recommendation including the one or more remedial actions.

In some variations, one or more features disclosed herein including the following features may optionally be included in any feasible combination. The first machine learning model may be a regression model or a principle component analysis model. The second machine learning model may be a neural network.

In some variations, the first machine learning model may be trained to determine, for each of the plurality of factors, a weight corresponding to how much each of the plurality of factors contribute to the sentiment that the end user exhibits towards the enterprise software application.

In some variations, the second machine learning model may be further trained to determine a priority for each of the plural of remedial actions. A first remedial action addressing a first factor may be associated with a higher priority than a second remedial action addressing a second factor based at least on the first factor contributing more to the sentiment of the end user than the second factor.

In some variations, the method may further include training, based at least on training data, the first machine learning model. The training data may include a plurality of feature vectors, each of the plurality of feature vectors including the plurality of factors. The training data may further include a corresponding sentiment index for each of the plurality of feature vectors. The first machine learning model may be trained by at least determining a weight matrix. Applying the weight matrix to each of the plurality of vectors may generate the corresponding sentiment index for each of the plurality of feature vectors.

In some variations, the method may further include training, based at least on training data, the second machine learning model. The training data may include a plurality of feature vectors. Each of the plurality of feature vectors may include the plurality of factors, The training data may further include a correct output indicating how much each of the plurality of factors contribute to a sentiment associated with a corresponding one of the plurality of feature vectors. The second machine learning model may be trained by adjusting one or more weights and/or biases applied by the second machine learning model to minimize an error in an output of the second machine learning model relative to the correct output included in the training data.

In another aspect, there is provided a computer program product that includes a non-transitory computer readable storage medium. The non-transitory computer-readable storage medium may include program code that causes operations when executed by at least one data processor. The operations may include: applying, to a plurality of factors associated with an end user, a first machine learning model, each of the plurality of factors contributing to a sentiment that the end user exhibits towards an enterprise software application, and the first machine learning model trained to determine, based at least on the plurality of factors, a sentiment index indicating the sentiment that the end user exhibits towards the enterprise software application; in response to the sentiment index exceeding a threshold value, applying a second machine learning model trained to identify a plurality of remedial actions for addressing one or more of the plurality of factors contributing to the sentiment of the end user; and generating a user interface configured to display, at a client device, a recommendation including the one or more remedial actions.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to machine learning models for sentiment prediction and remedial action recommendation, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Enterprise software applications may be integral to the operations of an organization. However, a variety of factors may impact the performance of an enterprise software application in a production environment. One or more of the same factors may further contribute to an end user's sentiment towards the enterprise software application. For example, the end user's satisfaction (or dissatisfaction) with respect to the enterprise software application may be contingent upon factors such as the end user's master data, the combination of enterprise software applications purchased by the end user, the end user's level of adoption, the availability of support, and the level of engagement with support. An inability to identify significant factors contributing to an end user's satisfaction (or dissatisfaction) combined with an inability to provide suitable remedial actions may negatively impact the ability to retain existing end users as well as acquire new end users. As such, in some example embodiments, an analysis engine may be configured to predict an end user's sentiment towards an enterprise software application including, for example, whether the end user exhibits positive sentiments or negative sentiments toward the enterprise software application. Moreover, the analysis engine may be configured to generate a recommendation of one or more remedial actions for addressing the factors contributing to the end user's negative sentiment.

In some example embodiments, the analysis engine may include a first machine learning model trained to predict a sentiment of an end user associated with an enterprise software application. The first machine learning model may be a regression model (e.g., a linear regression model, a polynomial regression model, and/or the like) or a principle component analysis (PCA) model trained to determine a sentiment index indicating, for example, whether the end user is satisfied or dissatisfied with the enterprise software application. The sentiment index may be a combination of the weighted scores assigned to one or more factors contributing to the end user's sentiment towards to the enterprise software application. As such, training the first machine learning model may include performing feature selection to identify which factors contribute more to the end user's sentiment towards the enterprise software application. For example, the first machine learning model may be trained, based at least on training data, to learn the weights associated with each factor. The first machine learning model may learn, based on the training data, that a first factor contributes more to the end user's sentiment towards the enterprise software application than a second factor and thus be assign, to the first factor, a first weight that is higher than a second weight assigned to the second factor.

In some example embodiments, the analysis engine may include a second machine learning model trained to determine one or more remedial actions responsive to the end user's sentiment. For example, the analysis engine may determine, based at least on the end user's sentiment index exceeding a threshold value, that the end user is dissatisfied with the enterprise software application. In response to the end user being dissatisfied with the enterprise software application, the analysis engine may apply the second machine learning model in order to identify one or more factors contributing to the end user's dissatisfaction. The second machine learning model may be a neural network (e.g., a convolutional neural network, a recurrent neural network, and/or the like) trained to determine how much each factor is contributing to the end user's dissatisfaction towards the enterprise software application. Moreover, the analysis engine may generate, based at least on the factors contributing to the end user's dissatisfaction, a recommendation of one or more remedial actions for addressing the factors contributing to the end user's dissatisfaction. For instance, the recommendation may include a first remedial action addressing with a first factor contributing to the end user's dissatisfaction and a second remedial action for addressing a second factor contributing to the end user's dissatisfaction. The recommendation may prioritize the first remedial action over the second remedial action based on the second machine learning model identifying the first factor as contributing more to the end user's dissatisfaction than the second factor.

Figure 1:
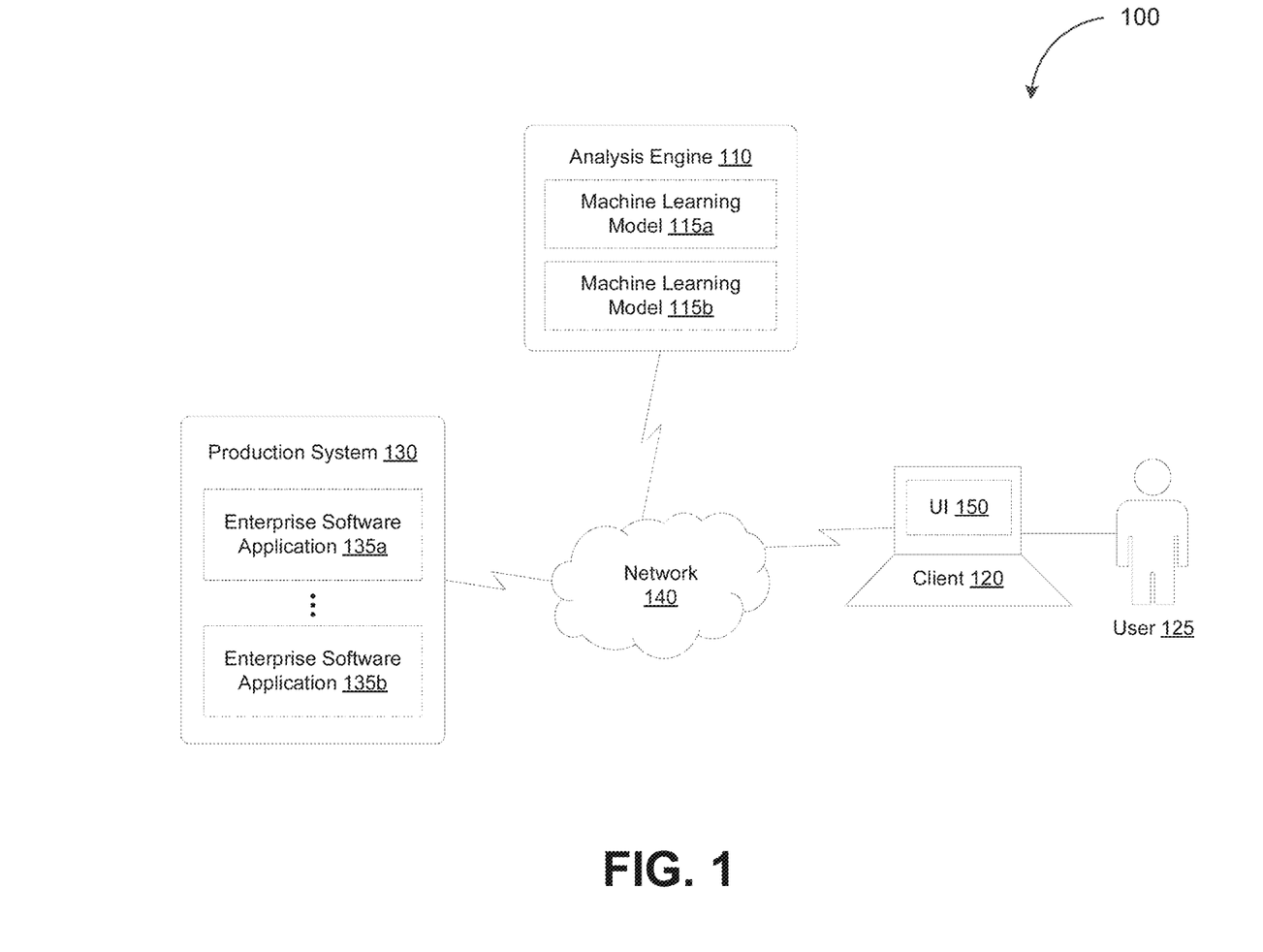
FIG. 1 depicts a system diagram illustrating a machine learning analysis system, in accordance with some example embodiments.

FIG. 1 depicts a system diagram illustrating a machine learning analysis system 100, in accordance with some example embodiments. Referring to FIG. 1, the machine learning analysis system 100 may include an analysis engine 110, a client 120, and a production system 130. As shown in FIG. 1, the analysis engine 110, the client 120, and the production system 130 may be communicatively coupled via a network 140. It should be appreciated that the client 120 may be a processor-based device including, for example, a smartphone, a tablet computer, a wearable apparatus, a virtual assistant, an Internet-of-Things (IoT) appliance, and/or the like. The network 140 may be a wired and/or wireless network including, for example, a wide area network (WAN), a local area network (LAN), a virtual local area network (VLAN), a public land mobile network (PLMN), the Internet, and/or the like.

In some example embodiments, the analysis engine 110 may be configured to predict a sentiment of a user 125 at the client 120 towards one or more enterprise software applications deployed at the production system 130 including, for example, a first enterprise software application 135a, a second enterprise software application 135b, and/or the like. For example, the analysis engine 110 may determine whether the user 125 exhibits a positive sentiment (e.g., satisfaction and/or the like) or a negative sentiment (e.g., dissatisfaction and/or the like) towards the first enterprise software application 135a. Moreover, the analysis engine 110 may respond to the user 125 exhibiting a negative sentiment (e.g., being dissatisfied with the first enterprise software application 135a) by generating a recommendation of one or more remedial actions for addressing the factors contributing to the negative sentiment exhibited by the user 125.

Referring again to FIG. 1, the analysis engine 110 may include a first machine learning model 115a trained to determine a sentiment index, which may be a value (e.g., from a set of discrete values or a continuous range of values) indicative of whether the user 125 is satisfied or dissatisfied with the first enterprise software application 135a. A variety of factors may contribute to the sentiment exhibited by the user 125 towards the first enterprise software application 135a. For example, the sentiment exhibited by the user 125 towards the first enterprise software application 135a may be contingent upon a master data associated with the first enterprise software application 135a, which may include data objects required for performing one or more functions of the first enterprise software application 135a. The sentiment exhibited by the user 125 towards the first enterprise software application 135a may also be contingent upon the other enterprise software applications, such as the second enterprise software application 135b, purchased by the user 125. Alternatively and/or additionally, the sentiment exhibited by the user 125 towards the first enterprise software application 135a may be contingent upon the extent the first enterprise software application 135a has been adopted by the user 125, the availability of support for the first enterprise software application 135a, and the level of engagement with support.

Figure 2A:
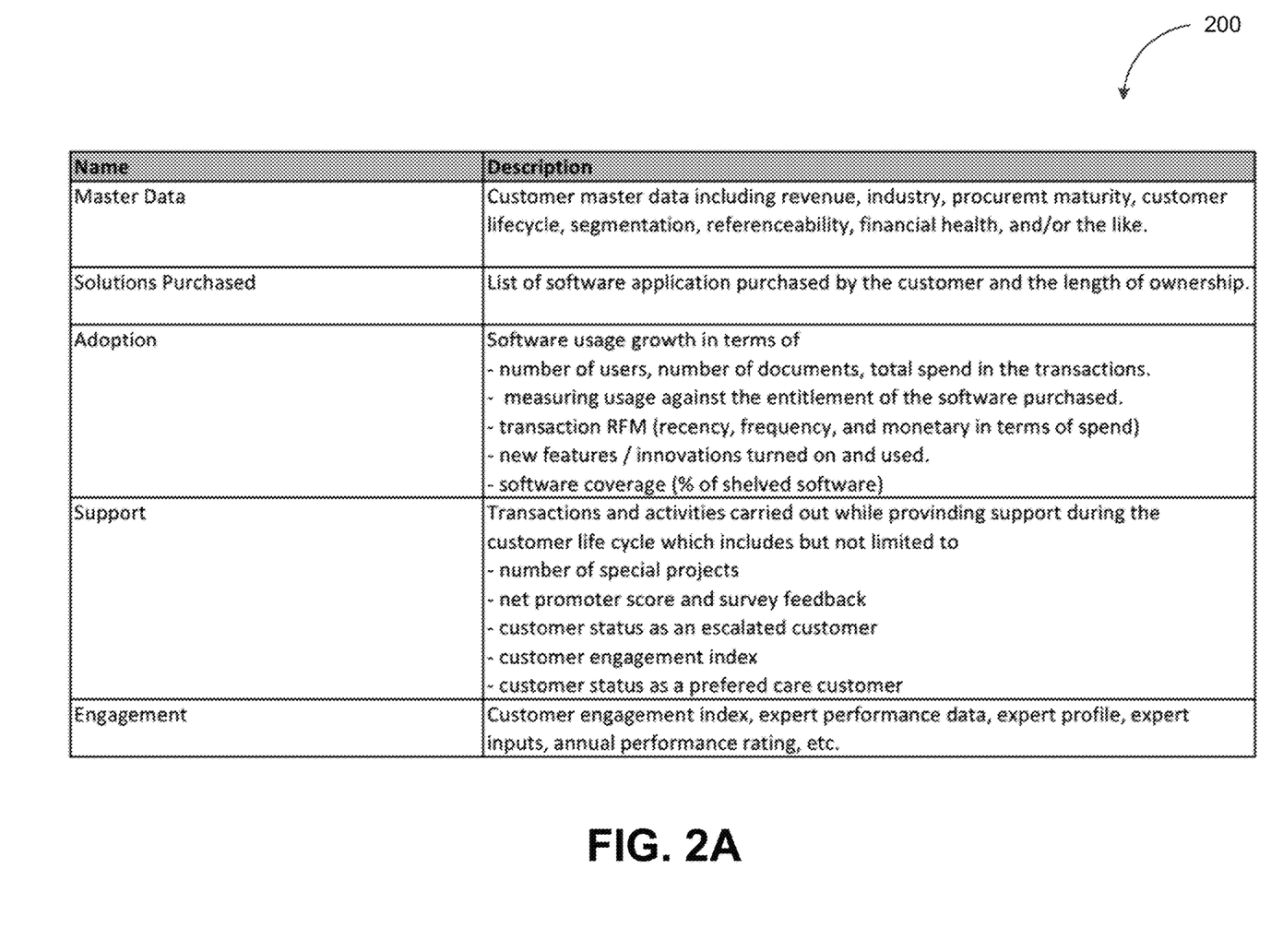
FIG. 2A depicts a table including examples of factors contributing to an end user's sentiments toward an enterprise software application, in accordance with some example embodiments.

To further illustrate, FIG. 2A depicts a table 200 that includes examples of factors that may contribute to the sentiment exhibited by the user 125 towards an enterprise software application such as, for example, the first enterprise software application 135a, the second enterprise software application 135b, and/or the like.

As noted, the first machine learning model 115a may be trained to a sentiment index indicative of whether the user 125 is satisfied or dissatisfied with the first enterprise software application 135a. In some example embodiments, this sentiment index may be a combination of the weighted scores assigned to one or more factors that contribute to the sentiment exhibited by the user 125 towards to the first enterprise software application 135a. For example, the user 125 may be associated with a sentiment index Y that is contingent upon one or more factors included in the feature vector $X=<x_1, x_2, x_3, x_4>$. That is, the sentiment index Y may be contingent upon a first factor $x_1$, a second factor $x_2$, a third factor $x_3$, and a fourth factor $x_4$. Each of the first factor $x_1$ the second factor $x_2$, the third factor $x_3$, and the fourth factor $x_4$ may be a value, for example, a score, assigned by the user 125. Moreover, the first factor $x_1$, the second factor $x_2$, the third factor $x_3$, and the fourth factor $x_4$ may each be associated with a weight corresponding to how much each factor contributes to the sentiment index Y of the user 125.

In some example embodiments, the first machine learning model 115a may be a regression model (e.g., a linear regression model, a polynomial regression model, and/or the like) or a principle component analysis (PCA) model that is trained, based on training data, to learn a weight matrix $W=\langle w_1, w_2, w_3, w_4 \rangle$ that may be applied to the feature vector X to derive the sentiment index Y. For example, the first machine learning model 115a may be trained based on training data that includes a plurality of training samples, each of which including a feature vector and a corresponding sentiment index. It should be appreciated that the sentiment indices included in the training data may be obtained using a variety of direct or indirect techniques. For example, if a sentiment index is not available from the user 125, the sentiment index may be inferred based on other values such as, for example, a net promoter score associated with the user 125.

Training the first machine learning model 115a may therefore include determining the weight matrix $W=\langle w_1, w_2, w_3, w_4 \rangle$ to fit the plurality of training samples included in the training data. Accordingly, training the first machine learning model 115a may include determining a first weight $w_1$ associated with the first factor $x_1$, a second weight $w_2$ associated with the second factor $x_2$, a third weight $w_3$ associated with the third factor $x_3$, and a fourth weight $w_4$ associated with the fourth factor $x_4$.

As noted, the value of the weight associated with a factor may correspond to how much the factor contributes to the sentiment exhibited by the user 125 towards the first enterprise software application 135a. For example, the first weight $w_1$ may be higher than the second weight $w_2$ if the first factor $x_1$ is determined to contribute more to the sentiment exhibited by the user 125 than the second factor $x_2$. Referring to Table 1, the factor "support" may be associated with a higher weight than the factor "solutions purchased" if, based on the training data, the first machine learning model 115a determines that the factor "support" contributes more to the sentiment exhibited by the user 125 than the factor "solutions purchased."

In some example embodiments, once trained, the analysis engine 110 may apply the first machine learning model 115a to determine, based at least on the feature vector $X=\langle x_1, x_2, x_3, x_4 \rangle$ associated with the user 125, the sentiment index Y. The sentiment index Y may be a value indicative of whether the user 125 is satisfied or dissatisfied with the first enterprise software application 135a. For example, the sentiment index Y may be a value from a discrete set of values or a continuous range of values. The analysis engine 110 may determine that the user 125 exhibits a negative sentiment towards the first enterprise software application 135a, such as being dissatisfied with the first enterprise software application 135a, if the sentiment index Y exceeds a threshold value. In response to determining the user 125 exhibits a negative sentiment towards the first enterprise software application 135a, the analysis engine 110 may be configured to identify one or more remedial actions for addressing the negative sentiment.

Referring again to FIG. 1, the analysis engine 110 may further include a second machine learning model 115b configured to identify the one or more remedial actions for addressing the factors contributing to the negative sentiment exhibited by the user 125 towards the first enterprise software application 135a. In some example embodiments, the second machine learning model 115b may be a neural network (e.g., a convolutional neural network, a recurrent neural network, and/or the like) trained to determine how much each of the first factor $x_1$, the second factor $x_2$, the third factor $x_3$, and the fourth factor $x_4$ contribute to the sentiment index Y of the user 125, as determined by the first machine learning model 115a. The analysis engine 110 may further generate, how much each of the first factor $x_1$, the second factor $x_2$, the third factor $x_3$, and the fourth factor $x_4$ contribute to the sentiment index Y of the user 125, a recommendation of one or more remedial actions for addressing the factors contributing to negative sentiment exhibited by the user 125.

The second machine learning model 115b may be trained based on training data that includes a plurality of training samples. Each training sample may include a feature vector having a plurality of factors as well as a correct output for the feature vector indicating, for example, how much each of the plurality of factors contribute to a sentiment (e.g., as indicated by a sentiment index) associated with the feature vector. Training the second machine learning model 115b may include adjusting one or more weights and/or biases applied by the second machine learning model 115b to minimize an error in an output of the second machine learning model 115b relative to the correct output associated with each of the plurality of training samples included in the training data.

In some example embodiments, the recommendation may include a first remedial action addressing the first factor $x_1$, a second remedial action addressing the second factor $x_2$, a third remedial action addressing the third factor $x_3$, and a fourth remedial action addressing the fourth factor $x_4$. Each remedial action may be associated with a priority that corresponds to how much the corresponding factor contributes to the negative sentiment exhibited by the user 125. For instance, the recommendation may prioritize the first remedial action over the second remedial action based on the second machine learning model 115b identifying the first factor $x_1$ as contributing more to the negative sentiment exhibited by the user 125 than the second factor $x_2$. As shown in FIG. 1, the analysis engine 110 may generate a user interface 150 configured to display, at the client 120, the recommendation including the one or more remedial actions for addressing the factors contributing to negative sentiment exhibited by the user 125.

Figure 2B:
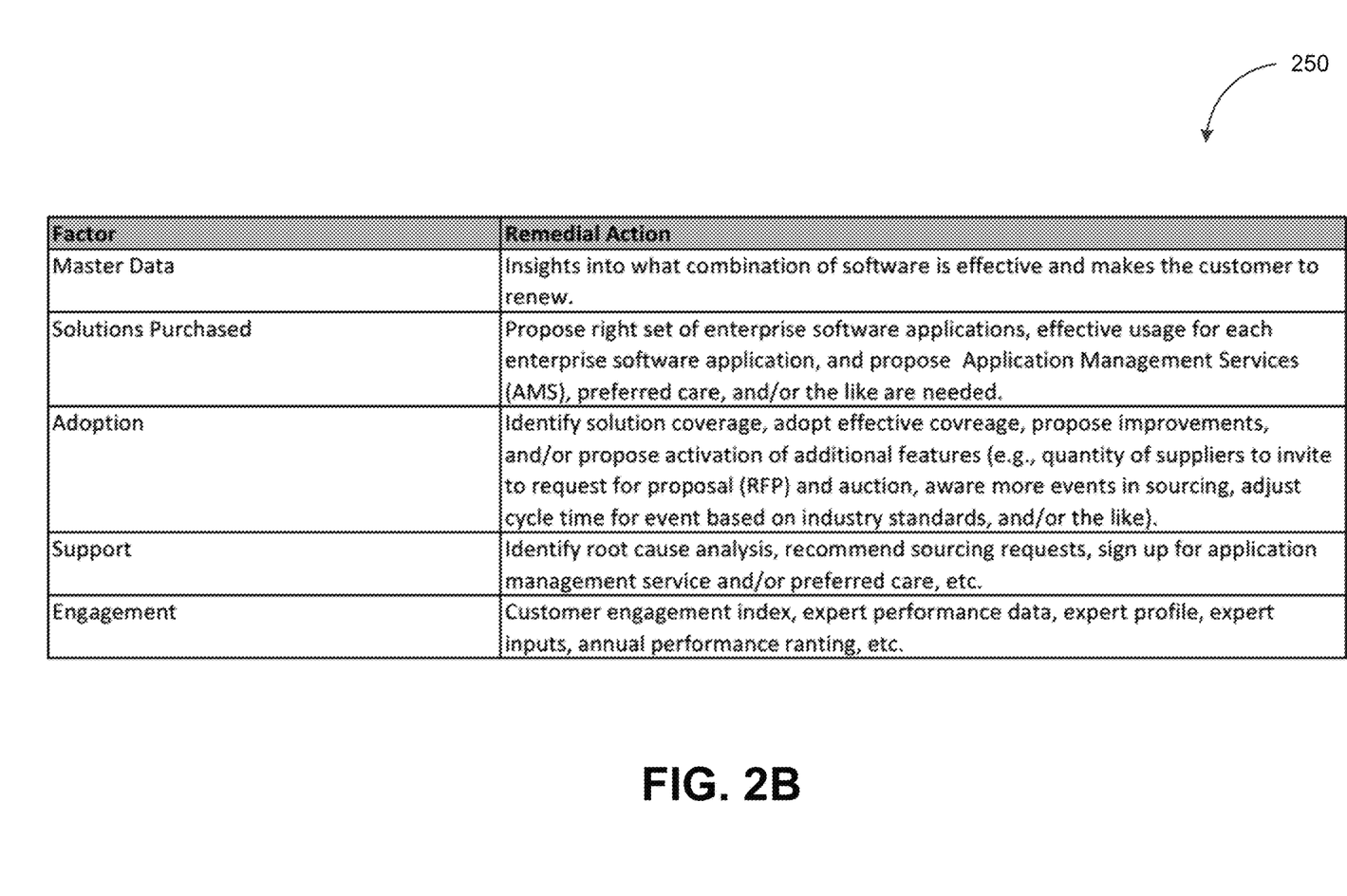
FIG. 2B depicts a table including examples of remedial actions for addressing factors contributing to an end user's sentiments toward an enterprise software application, in accordance with some example embodiments.

To further illustrate, FIG. 2B depicts a table 250 that includes examples remedial actions for addressing each of the factors contributing to the sentiment exhibited by the user 125 towards the first enterprise software application 135a. For example, as shown in FIG. 2B, to address the factor "solution purchased" negatively impacting the sentiment of the user 125 towards the first enterprise software application 135a, the analysis engine 110 may propose a combination of enterprise software applications, share industry specific best procurement practices, and/or the like. The remedial actions associated with the factor "solutions purchased" may be prioritized based on how much the factor "solutions purchased" contributed to the sentiment exhibited by the user 125 towards the first enterprise software application 135a.

Figure 3:
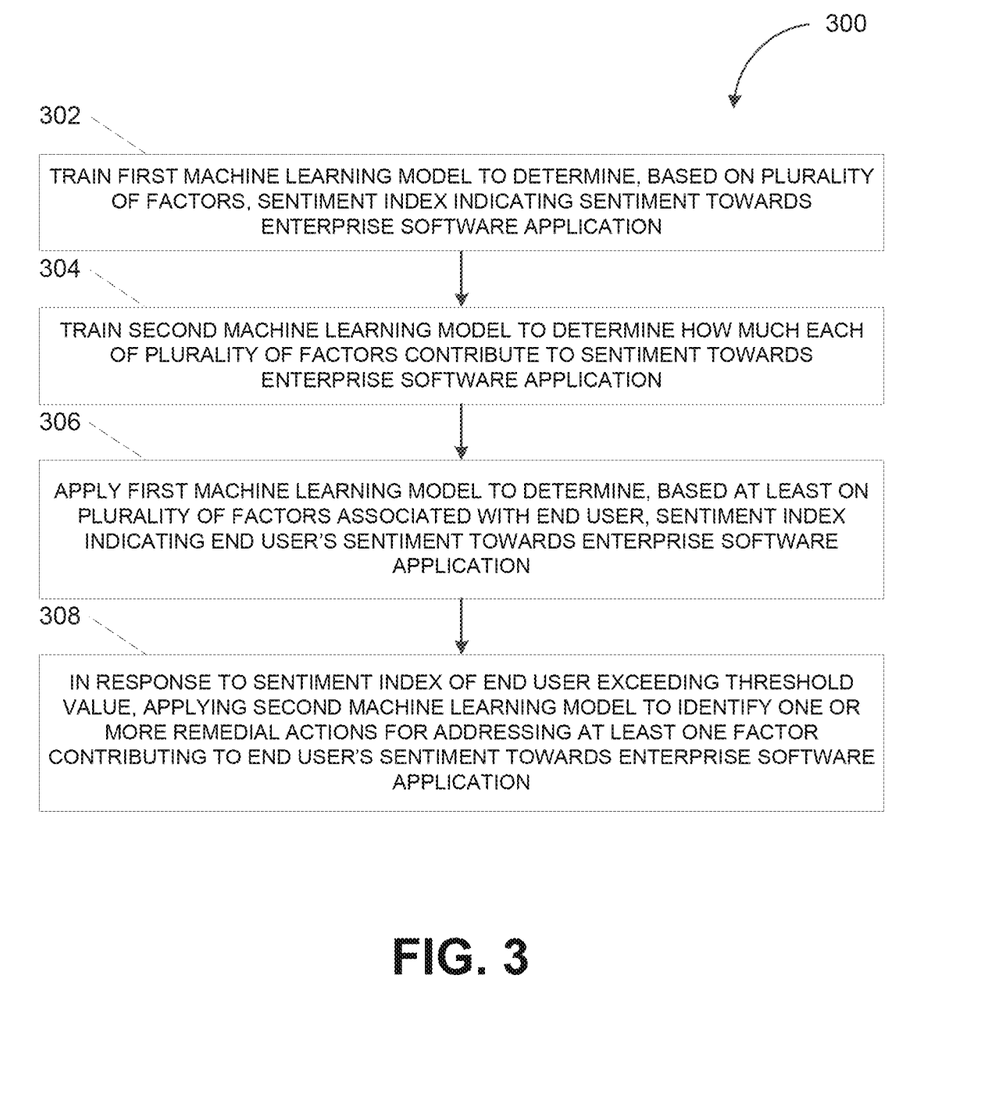
FIG. 3 depicts a flowchart illustrating an example of a process for sentiment prediction and remedial action recommendation, in accordance with some example embodiments.

FIG. 3 depicts a flowchart illustrating a process 300 for text classification, in accordance with some example embodiments. Referring to FIGS. 1 and 3, the process 300 may be performed by the analysis engine 110 in order to predict a sentiment that the user 125 exhibits towards, for example, the first enterprise software application 135a as well as to identify one or more remedial actions for addressing the factors contributing to the sentiment of the user 125.

At 302, the analysis engine 110 may train a first machine learning model to determine, based at least on a plurality of factors, a sentiment index indicating a sentiment towards an enterprise software application. In some example embodiments, the analysis engine 110 may train the first machine learning model 115a to determine a sentiment index indicating, for example, whether the user 125 exhibits a positive sentiment (e.g., satisfaction and/or the like) or a negative sentiment (e.g., dissatisfaction and/or the like) towards the first enterprise software application 135a. For example, the analysis engine 110 may train the first machine learning model 115a based on training data that includes a plurality of training samples, each of which including a feature vector and a corresponding sentiment index. Training the first machine learning model 115a may include determining the weight matrix $W=<w_1, w_2, w_3, w_4>$ to fit the plurality of training samples included in the training data. For instance, as noted, training the first machine learning model 115a may include learning the first weight $w_1$ associated with the first factor $x_1$, the second weight $w_2$ associated with the second factor $x_2$, the third weight $w_3$ associated with the third factor $x_3$, and the fourth weight $w_4$ associated with the fourth factor $x_4$. The first machine learning model 115a may be trained to determine the values of first weight $w_1$, the second weight $w_2$, the third weight $w_3$, and the fourth weight $w_4$ such that the weight matrix $W=<w_1, w_2, w_3, w_4>$ may be applied to each of the feature vectors included in the training data to derive a value that matches the corresponding sentiment index as closely as possible.

At 304, the analysis engine 110 may train a second machine learning model to determine how much each of the plurality of factors contribute to the sentiment towards the enterprise software application. In some example embodiments, the analysis engine 110 may train the second machine learning model 115b to identify one or more remedial actions for addressing the factors contributing to the sentiment exhibited by the user 125 towards the first enterprise software application 135a. For example, the second machine learning model 115b may be trained based on training data that includes a plurality of training samples. Each training sample may include a feature vector having a plurality of factors (e.g., the first factor $x_1$, the second factor $x_2$, the third factor $x_3$, and the fourth factor $x_4$) as well as a correct output for the feature vector designating, for example, how much each of the plurality of factors contribute to a sentiment (e.g., as indicated by a sentiment index) associated with the feature vector. As noted, training the second machine learning model 115b may include adjusting one or more weights and/or biases applied by the second machine learning model 115b to minimize an error in an output of the second machine learning model 115b relative to the correct output associated with each of the plurality of training samples included in the training data.

At 306, the analysis engine 110 may apply the first machine learning model to determine, based at least on a plurality of factors associated with an end user, a sentiment index indicating the end user's sentiment towards the enterprise software application. For example, the analysis engine 110 may apply the first machine learning model 115a to determine the sentiment index Y indicating the sentiment exhibited by the user 125 towards the first enterprise software application 135a. The first machine learning model 115a may determine the sentiment index Y for the user 125 by at least applying, to the feature vector $X=<x_1, x_2, x_3, x_4>$ associated with the user 125, the weight matrix $W=<w_1, w_2, w_3, w_4>$ learned during the training of the first machine learning model 115a. As noted, the sentiment index Y may be a value from a set of discrete values or a value from a continuous range of values.

At 308, the analysis engine 110 may respond to the sentiment index of the end user exceeding a threshold value by applying the second machine learning model to identify one or more remedial actions for addressing at least one factor contributing to the end user's sentiment towards the enterprise software application. In some example embodiments, the analysis engine 110 may respond to the sentiment index Y of the user 125 exceeding a threshold value by at least applying the second machine learning model 115b to identify one or more remedial actions for addressing the factors contributing to the sentiment exhibited by the user 125. For example, the second machine learning model 115b may be applied to determine how much each of the first factor $x_1$, the second factor $x_2$, the third factor $x_3$, and the fourth factor $x_4$ contribute to the sentiment index Y of the user 125, as determined by the first machine learning model 115a.

In some example embodiments, the analysis engine 110 may generate, based at least on an output from the second machine learning model 115b, a recommendation that includes, for example, the first remedial action addressing the first factor $x_1$, the second remedial action addressing the second factor $x_2$, the third remedial action addressing the third factor $x_3$, and the fourth remedial action addressing the fourth factor $x_4$. As noted, each remedial action may be associated with a priority that corresponds to how much the corresponding factor contributes to the sentiment exhibited by the user 125. For example, the recommendation may prioritize the first remedial action over the second remedial action based on the second machine learning model 115b identifying the first factor $x_1$ as contributing more to the sentiment exhibited by the user 125 than the second factor $x_2$. Moreover, as shown in FIG. 1, the analysis engine 110 may generate the user interface 150, which may be configured to display, at the client 120, the recommendation including the one or more remedial actions for addressing the factors contributing to sentiment exhibited by the user 125.

Figure 4:
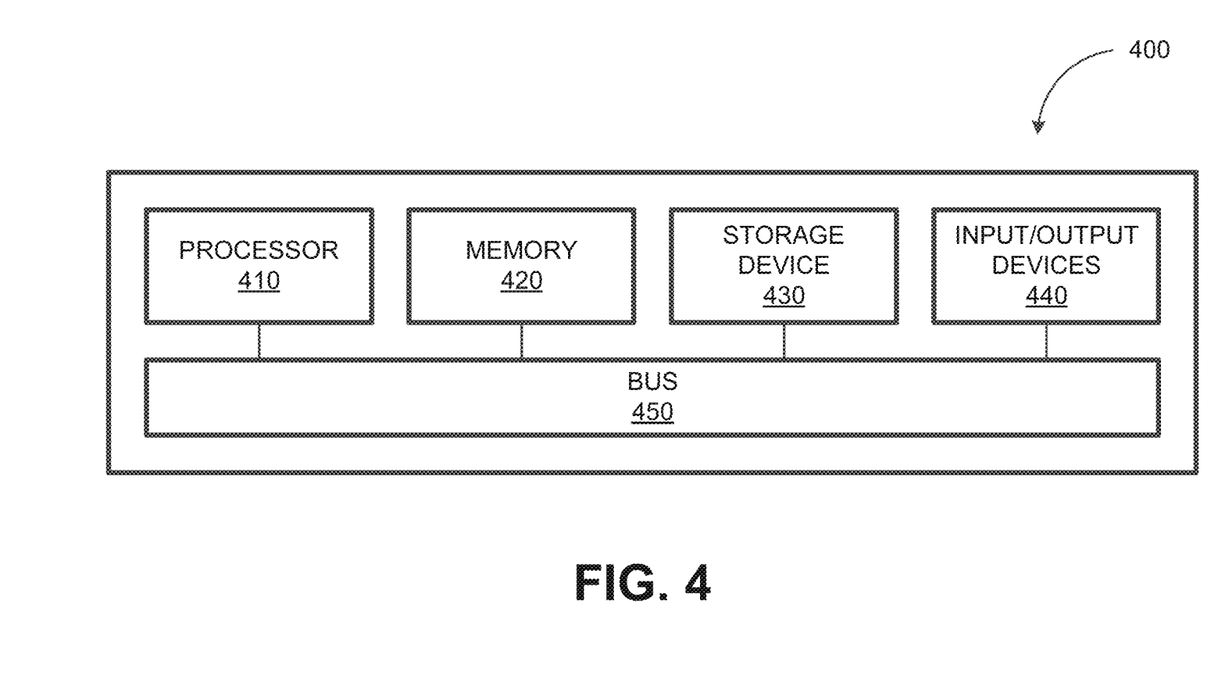
FIG. 4 depicts a block diagram illustrating a computing system, in accordance with some example embodiments.

FIG. 4 depicts a block diagram illustrating a computing system 400 consistent with implementations of the current subject matter. Referring to FIGS. 1-4, the computing system 400 can be used to implement the analysis engine 110 and/or any components therein.

As shown in FIG. 4, the computing system 400 can include a processor 410, a memory 420, a storage device 430, and input/output device 440. The processor 410, the memory 420, the storage device 430, and the input/output device 440 can be interconnected via a system bus 450. The processor 410 is capable of processing instructions for execution within the computing system 400. Such executed instructions can implement one or more components of, for example, the analysis engine 110. In some example embodiments, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, a tape device, a solid-state device, and/or any other suitable persistent storage means. The input/output device 440 provides input/output operations for the computing system 400. In some example embodiments, the input/output device 440 includes a keyboard and/or pointing device. In various implementations, the input/output device 440 includes a display unit for displaying graphical user interfaces.

According to some example embodiments, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some example embodiments, the computing system 400 can be used to execute various interactive computer software applications that can be used for organization, prediction and/or storage of data in various formats. Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   applying, to a plurality of factors associated with an end user, a first machine learning model, each of the plurality of factors contributing to a sentiment that the end user exhibits towards an enterprise software application, wherein the first machine learning model is trained to determine, based at least on the plurality of factors, a sentiment index indicating the sentiment that the end user exhibits towards the enterprise software application, and wherein the first machine learning model is further trained to determine, for each of the plurality of factors, a weight corresponding to how much each of the plurality of factors contribute to the sentiment that the end user exhibits towards the enterprise software application;
   in response to the sentiment index exceeding a threshold value, applying a second machine learning model trained to identify a plurality of remedial actions for addressing one or more of the plurality of factors contributing to the sentiment of the end user, wherein the second machine learning model is further trained to determine a priority for each of the plurality of remedial actions such that a first remedial action addressing a first factor is associated with a higher priority than a second remedial action addressing a second factor based at least on the first machine learning model determining that the first factor contributes more to the sentiment of the end user than the second factor; and
   generating a user interface displaying, at a client device, a recommendation including the one or more remedial actions.

2. The system of claim 1, wherein the first machine learning model comprises a regression model or a principle component analysis model.

3. The system of claim 1, wherein the second machine learning model comprises a neural network.

4. The system of claim 1, further comprising:
   training, based at least on training data, the first machine learning model, the training data including a plurality of feature vectors, each of the plurality of feature vectors including the plurality of factors, and the training data further including a corresponding sentiment index for each of the plurality of feature vectors.

5. The system of claim 4, wherein the first machine learning model is trained by at least determining a weight matrix, and wherein applying the weight matrix to each of the plurality of feature vectors generates the corresponding sentiment index for each of the plurality of feature vectors.

6. The system of claim 1, further comprising:
   training, based at least on training data, the second machine learning model, the training data including a plurality of feature vectors, each of the plurality of feature vectors including the plurality of factors, and the training data further including a correct output indicating how much each of the plurality of factors contribute to a sentiment associated with a corresponding one of the plurality of feature vectors.

7. The system of claim 6, wherein the second machine learning model is trained by adjusting one or more weights and/or biases applied by the second machine learning model to minimize an error in an output of the second machine learning model relative to the correct output included in the training data.

8. The system of claim 1, wherein the plurality of factors include a master data including one or more data objects required for performing one or more functions of the enterprise software application, a combination of enterprise software applications purchased by the end user, a level of adoption associated with the end user, an availability of support for the enterprise software application, and a level of end user engagement with support.

9. A computer-implemented method, comprising:
   applying, to a plurality of factors associated with an end user, a first machine learning model, each of the plurality of factors contributing to a sentiment that the end user exhibits towards an enterprise software application, wherein the first machine learning model is trained to determine, based at least on the plurality of factors, a sentiment index indicating the sentiment that the end user exhibits towards the enterprise software application, and wherein the first machine learning model is further trained to determine, for each of the plurality of factors, a weight corresponding to how much each of the plurality of factors contribute to the sentiment that the end user exhibits towards the enterprise software application;
   in response to the sentiment index exceeding a threshold value, applying a second machine learning model trained to identify a plurality of remedial actions for addressing one or more of the plurality of factors contributing to the sentiment of the end user, wherein the second machine learning model is further trained to determine a priority for each of the plurality of remedial actions such that a first remedial action addressing a first factor is associated with a higher priority than a second remedial action addressing a second factor based at least on the first machine learning model determining that the first factor contributes more to the sentiment of the end user than the second factor; and
   generating a user interface displaying, at a client device, a recommendation including the one or more remedial actions.

10. The computer-implemented method of claim 9, wherein the first machine learning model comprises a regression model or a principle component analysis model.

11. The computer-implemented method of claim 9, wherein the second machine learning model comprises a neural network.

12. The computer-implemented method of claim 9, further comprising:
    training, based at least on training data, the first machine learning model, the training data including a plurality of feature vectors, each of the plurality of feature vectors including the plurality of factors, and the training data further including a corresponding sentiment index for each of the plurality of feature vectors.

13. The computer-implemented method of claim 12, wherein the first machine learning model is trained by at least determining a weight matrix, and wherein applying the weight matrix to each of the plurality of feature vectors generates the corresponding sentiment index for each of the plurality of feature vectors.

14. The computer-implemented method of claim 9, further comprising:

training, based at least on training data, the second machine learning model, the training data including a plurality of feature vectors, each of the plurality of feature vectors including the plurality of factors, and the training data further including a correct output indicating how much each of the plurality of factors contribute to a sentiment associated with a corresponding one of the plurality of feature vectors.

15. The computer-implemented method of claim 14, wherein the second machine learning model is trained by adjusting one or more weights and/or biases applied by the second machine learning model to minimize an error in an output of the second machine learning model relative to the correct output included in the training data.

16. A non-transitory computer readable medium storing instructions, which when executed by at least one data processor, result in operations comprising:

applying, to a plurality of factors associated with an end user, a first machine learning model, each of the plurality of factors contributing to a sentiment that the end user exhibits towards an enterprise software application, wherein the first machine learning model is trained to determine, based at least on the plurality of factors, a sentiment index indicating the sentiment that the end user exhibits towards the enterprise software application, and wherein the first machine learning model is further trained to determine, for each of the plurality of factors, a weight corresponding to how much each of the plurality of factors contribute to the sentiment that the end user exhibits towards the enterprise software application;

in response to the sentiment index exceeding a threshold value, applying a second machine learning model trained to identify a plurality of remedial actions for addressing one or more of the plurality of factors contributing to the sentiment of the end user, wherein the second machine learning model is further trained to determine a priority for each of the plurality of remedial actions such that a first remedial action addressing a first factor is associated with a higher priority than a second remedial action addressing a second factor based at least on the first machine learning model determining that the first factor contributes more to the sentiment of the end user than the second factor; and generating a user interface displaying, at a client device, a recommendation including the one or more remedial actions.

* * * * *